May 2, 1967 L. K. QUICK 3,316,731
TEMPERATURE RESPONSIVE MODULATING CONTROL VALVE
FOR A REFRIGERATION SYSTEM
Filed March 1, 1965 2 Sheets-Sheet 2

INVENTOR.
LESTER K. QUICK
BY Lyon & Lyon
ATTORNEYS

United States Patent Office 3,316,731
Patented May 2, 1967

3,316,731
TEMPERATURE RESPONSIVE MODULATING CONTROL VALVE FOR A REFRIGERATION SYSTEM
Lester K. Quick, Eugene, Oreg.
(25 Provincial Court, St. Louis, Mo. 63122)
Filed Mar. 1, 1965, Ser. No. 435,895
17 Claims. (Cl. 62—196)

This invention relates to refrigeration systems and control valves therefor and, in particular, is directed to a valve for use on the outlet of the evaporator coil of the refrigeration system for modulating the refrigerant back pressure on the evaporator coil in response to temperature changes in the fixture refrigerated by that evaporator coil. Further, this invention relates to a system employing such a valve whereby temperature control is accomplished solely by such valve, thereby obviating the necessity for conventional compressor cycling or conventional thermostat liquid refrigerant control on the evaporator inlet for temperature control.

The importance of maintaining a proper temperature in refrigerated display and storage fixtures is well recognized and the proper temperature for a particular fixture will depend on the product stored or displayed in such fixture. Moreover, it has been recognized by those skilled in the art that maintaining the proper humidity of the air surrounding the product is extremely important unless such product is so packaged as to completely retain the product moisture. However, in order to maintain the atmosphere surrounding the refrigerated product at the desired temperature, it is necessary for that atmosphere to be in contact with or circulated in contact with a refrigerated surface, such as an evaporator coil, to extract the heat developed in that atmosphere while surrounding the product. This atmosphere is then recirculated in its cooled condition to the area of the product. In cooling the air forming this atmosphere, if the temperature is lowered below the dew point of the air then moisture is extracted and formed on the cooling surface in the form of condensation or frost which reduces the humidity of the air. When this air is recirculated over the product the temperature is increased and the air is capable of and does absorb moisture from the product which is again in turn deposited in the form of condensation or frost on the cooling surface. This cycle is continually repeated with the obvious undesirable drying effect. The larger the temperature difference between the atmosphere surrounding the product and the cooling surface, the larger the capacity for moisture absorption will be.

In the conventional temperature control of refrigerated fixtures there is a substantial difference between the desired fixture temperature and the temperature of the evaporator coil or cooling surface during at least a significant proportion of the operation of the system. The standard practice in temperature control of a fixture is by periodic starting and stopping of the refrigeration action in response to the refrigeration needs as sensed, for example, by thermostatic means associated with the fixture. This periodic refrigeration cycling is conventionally accomplished by either on-off cycling of the compressor by opening and closing a valve on the inlet of the evaporator coil to admit the needed liquid refrigerant. The on-off cycling of the compressor may also be accomplished by other conventional means well known to those skilled in the art rather than thermostatic control means. This refrigeration cycling has been considered an inherent necessity since the system must be sized for accomplishing refrigeration under the most adverse climatic conditions likely to be encountered and yet such conditions will, at the most, prevail only a minority of the time, thereby requiring cycling during all other times to prevent over-refrigeration. Since the refrigeration action is periodically cycling, the temperature of the atmosphere cooling surface varies correspondingly, thereby periodically absorbing moisture from the atmosphere to cause the undesirable dehydration of the refrigerated product.

While certain devices have been developed and steps taken toward alleviating some of the foregoing problems, the resultant system is often disproportionately costly in original construction, operation or maintenance. For example, control of the fixture temperature within a closer range by maintaining the evaporator coil within a more exact temperature range is obviously advantageous but the more frequent cycling of the compressor or inlet control value, depending on the type of system employed, will result in a shortened useful life of that device. Moreover, this cycling within a smaller than conventional range merely reduces rather than eliminating the temperature variation and humidity problem. Another approach that has been occassionally and unsuccessfully attempted is to control the back pressure on the evaporator coil by a regulating valve on the outlet of the coil but the high pressure drop required across the heretofore conventional valves introduced intolerable inefficiencies. Moreover, the complexity of such heretofore conventional valves has rendered them prohibitively expensive.

Accordingly, it is a principal object of this invention to provide a novel form of refrigeration evaporator outlet valve for modulating the back pressure on the evaporator in response to temperature changes in the fixture refrigerated by the evaporator.

A further object of this invention is to provide a novel refrigeration system adapted to permit continuous compressor operation wherein the pressure on the suction side of the evaporator coil is modulated to produce the required cooling and desired fixture temperature without regard for the suction produced by the compressor.

Still another object of this invention is to provide such a system wherein plural separate fixtures and associated evaporators are operated by a single continuously running compressor and may be separately adjusted to operate at different temperatures by varying the actual refrigerant pressure in each evaporator without regard for the compressor suction pressure.

Another object of this invention is to provide a temperature-sensitive back pressure modulating valve for refrigeration system evaporators whereby the refrigerant pressure in the evaporator is varied inversely with respect to variations in desired fixture temperature to tend to maintain a more clearly constant fixture temperature by minimum variations in evaporator coil temperature. Still another object of this invention is to provide such a valve and arrangement whereby maximum refrigerating effect is accomplished during periods of maximum required refrigeration, thereby rapidly reducing the fixture temperature to the desired temperature. Still another and more detailed object is to provide such a valve and arrangement whereby the size of the evaporator coil may be minimized since cooling is accomplished by continuous operation and maximum cooling is obtained by reducing the back pressure to lower the refrigerant evaporating temperature thereby increasing the temperature differential to cause an increase in the volume of refrigerant that is evaporating.

A still further object of this invention is to provide a novel form of control valve for the outlet of an evaporator coil wherein fixture temperature-sensitive means serve to automatically modulate the opening and closing of the valve to closely control the back pressure on the evaporator coil inversely relative to the sensed fixture temperature. A still further object is to provide such an arrangement wherein the controlled evaporator back pressure produced by the valve is substantially stable during equilibrium operation of the refrigerated fixture whereby there is a minimum temperature difference between the cooling surface of the evaporator coil and the desired fixture temperature which is being maintained, thereby producing the most ideal humidity conditions. Still another object is to provide such a valve wherein the force required for opening and closing the valve is produced by the refrigerant and yet only a minimum pressure drop across the valve is required for opening thereof.

Other and more detailed objects and advantages of this invention will appear from the following description and the accompanying drawings, wherein:

FIGURE 4 is a fragmentary sectional elevation of a further modified form of the valve of this invention with the components thereof in a closed condition.

FIGURE 5 is a fragmentary sectional elevation of a still further modified form of the valve of this invention with the components thereof in a partially open condition of the valve.

Figure 1:
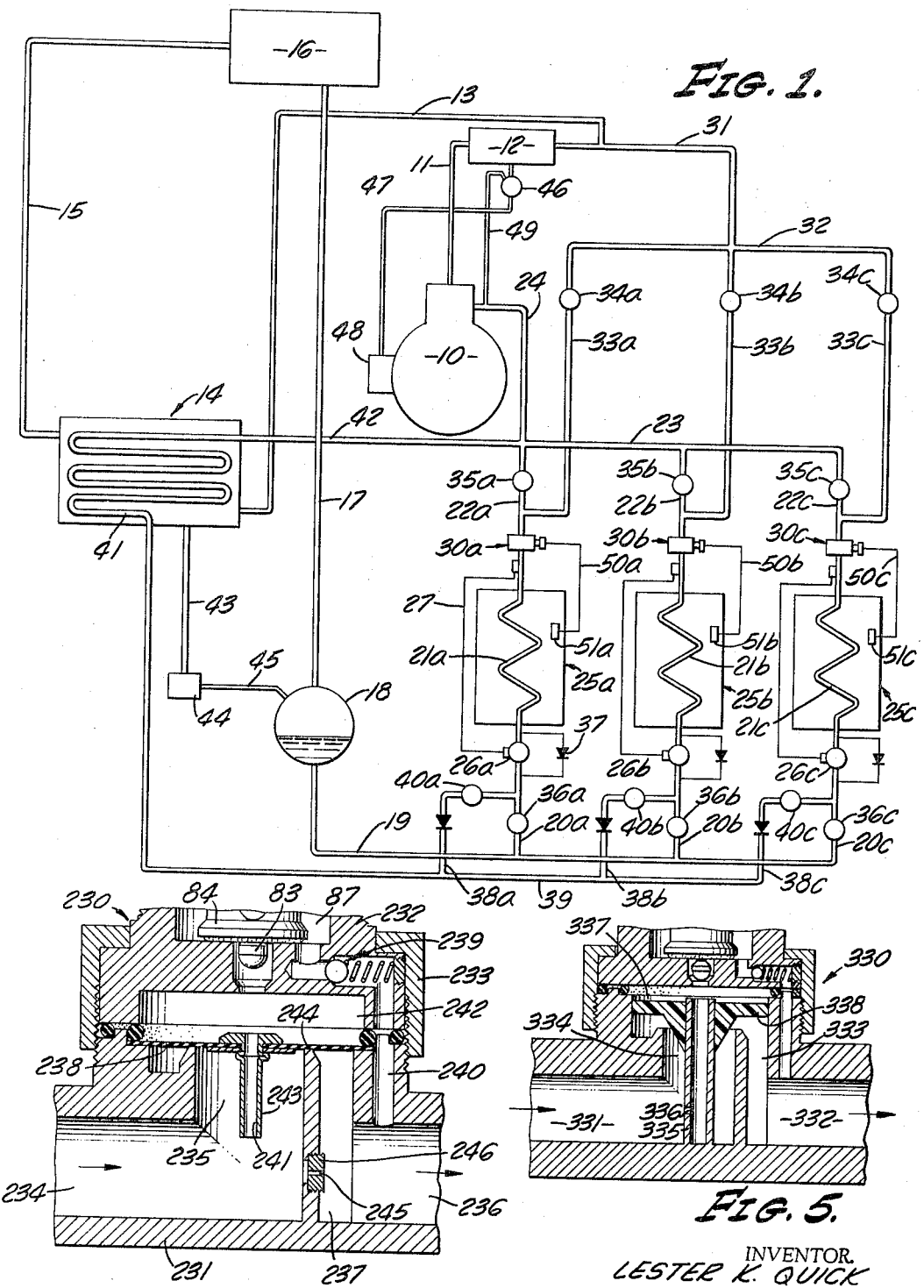
FIGURE 1 is a diagrammatic illustration of a refrigertion system of this invention employing the valve of this invention.

Referring now more particularly to FIGURE 1, a refrigeration system is shown which includes many conventional components arranged in somewhat conventional fashion but also includes other components and manner of arrangement which are novel with this invention. Moreover, the illustrated refrigeration system is merely exemplary of one practical and advantageous use of the modulating valve of this invention. It is to be understood and will readily appear to those skilled in the art that the valve of this invention may be advantageously used in various modified forms of the illustrated refrigeration system without departing from this invention.

The refrigeration system in FIGURE 1 is of the well known type wherein a refrigerant in the gaseous form is compressed to a hot gaseous form, heat is extracted in a condenser to change the refrigerant to a liquid form, the refrigerant is evaporated in an evaporator coil to absorb heat, and then this low pressure gaseous refrigerant is returned for recompressing to complete the cycle. Specifically, the outlet of compressor 10 is connected by a conduit 11 to and through an oil separator 12 to a conduit 13 and then through the tank portion of a heat exchanger 14 and conduit 15 to a condenser 16. A conduit 17 connects condenser 16 with a receiver 18 which is in turn connected through a liquid header 19 to branch conduits 20a, 20b and 20c leading to individual evaporators 21a, 21b and 21c, respectively. The outlets of the evaporator coils 21a, 21b and 21c are connected through individual conduits 22a, 22b and 22c respectively, to a suction header 23 which is in turn connected through a conduit 24 to the suction inlet of the compressor 10. While the refrigeration system has been illustrated as having three evaporators for refrigerating separate fixtures 25a, 25b and 25c, it is to be understood and will readily appear to those skilled in the art that more or fewer evaporator coils and fixtures may be employed as desired and even additional compressors may be used if compressor compounding or parallel compressors are desirable. Throughout this description a component designated by a numeral followed by a lower-case letter is physically and operationally distinct but substantially identical to a component designed by the same number but followed by a different letter and use of that numeral alone will designate those components generally.

A conventional expansion valve 26a, 26b and 26c is provided in each of the branch conduits 20a, 20b and 20c, respectively, for metering the liquid refrigerant into the associated evaporator coil, thereby reducing the refrigerant pressure. Expansion valves 26a, 26b and 26c may be of any conventional type such as the type that is responsive to the temperature of the refrigerant at the outlet of the evaporator coil through a capillary tube 27 connected to and sensing the temperature of the outlet of the evaporator coil.

Means are provided for individually controlling the temperature in each of the refrigerated fixtures and as shown in the drawings, these may include the modulating valves, generally designated 30a, 30b and 30c, of this invention which will be hereinafter described in detail. In heretofore conventional refrigeration systems of the general type illustrated in FIGURE 1, the fixture temperature would be controlled by either on-off cycling of compressor 10 or, particularly with these plural evaporators, by providing a temperature-responsive feed valve in each of the branch conduits 20a, 20b and 20c upstream of the expansion valve to "on-off" feed liquid refrigerant to the associated evaporator as required for refrigerating. As is well known, the temperature at which a given refrigerant will evaporate depends on the pressure and yet with either of these conventional temperature control methods the suction pressure on the evaporator coil will vary substantially and continually, thereby causing undesirable temperature variation in the associated fixture and stored products.

The illustrated refrigeration system also includes means for advantageously employing the hot compressed gaseous refrigerant from compressor 10 for periodically defrosting the evaporator coils 21a, 21b and 21c as is a well known requirement in refrigeration systems. By using the hereafter-described hot gas defrosting arrangement or variations thereof known to those skilled in the art, the evaporator coil defrosting is economically accomplished and it is unnecessary to provide expensive electrical heaters and the like. Moreover, the modulating valve 30 of this invention readily cooperates with and complements the use of a hot gas defrosting arrangement as will appear more fully from the hereinafter more detailed description of such valve.

For the hot gas defrosting arrangement, a conduit 31 is connected from the hot gas conduit 13 to a hot gas header 32. Individual hot gas lines 33a, 33b and 33c are connected between the hot gas header 32 and the separate outlet conduits 22a, 22b and 22c, respectively, from the evaporator coils. A solenoid-operated valve 34a, 34b and 34c is positioned in each of the hot gas lines 33a, 33b and 33c, respectively, for controlling the flow therethrough and similarly, solenoid-operated valves 35a, 35b and 35c are provided in the outlet conduits 22a, 22b and 22c, respectively, between the suction header 23 and the point of connection of hot gas lines 33a, 33b and 33c. Thus, by closing any one of the valves 35 and opening a valve 34 associated with the same evaporator coil 21, the suction of that evaporator coil will be terminated and hot gaseous refrigerant will be supplied to the evaporator coil from the compressor through conduits 11 and 31, hot gas header 32, and the associated hot gas line 33. A solenoid-operated valve 36a, 36b and 36c is provided in each of the inlet branch conduits 20a, 20b and 20c, respectively, to the evaporators for terminating the flow of liquid refrigerant to that evaporator coil during defrosting thereof. A bypass line and check valve 37 is provided around each expansion valve 26a, 26b and 26c for allowing the flow of defrosting refrigerant around the expansion valve without causing reverse flow through the expansion valve. A separate conduit 38a, 38b and 38c is connected between a header 39 and each of the inlet branch conduits 20a, 20b and 20c, respectively, between the solenoid valve 36 and the expansion valve 26. A solenoid-operated valve 40a, 40b and 40c is provided in each of the conduits 38a, 38b and 38c, respectively, with a check valve for selectively permitting refrigerant flow from a branch conduit 20 to the header 39. Thus, when defrosting a particular evaporator coil the associated valve 36 is closed and the associated valve 40 is opened whereby the refrigerant condensed during defrosting passes from that evaporator coil 21 to the header 39. The refrigerant used in defrosting an evaporator coil will reach header 39 in a predominantly liquid state but at a lowered pressure insufficient for reintroducing such refrigerant into the high pressure side of the system such as at the receiver 18. In order to return this defrosting refrigerant to the normal refrigeration cycle, the header 39 is connected to a heat exchange coil 41 in the heat exchanger 14 to evaporate such refrigerant by reason of the hot gaseous refrigerant passing through the tank portion of the heat exchanger from conduit 13 to conduit 15. The outlet end of coil 41 is connected by conduit 42 to the suction conduit 24 of the compressor for returning the defrosting refrigerant to the compressor for recompression. The evaporation of such refrigerant in heat exchanger 14 prevents any liquid refrigerant from being returned to the compressor which could cause damage to the compressor. The tank portion of heat exchanger 14 is provided with a drain line 43 connected through a float valve 44 and a conduit 45 to the receiver 18 whereby refrigerant condensing in such tank portion is delivered to the receiver for normal use in the system.

Completing the illustrated refrigeration system, although such is not necessary to this invention, is an oil reservoir 46 for receiving the oil separated by oil separator 12, an oil return line 47 from the reservoir to a valve mechanism 48 returning the oil to the sump of the compressor 10, and a degassing line 49 connected from the top of oil reservoir 46 to suction of the compressor for lowering the pressure in oil reservoir 46 thereby causing any liquid refrigerant reaching oil reservoir 46 to boil away and be drawn back to the compressor. The degassing line 49 and float valve 48 are absolutely not necessary to the single compressor arrangement shown but rather would usually be employed only in multiple compressor systems.

Thus, under normal refrigerating operation of the illustrated system, the valves 35a, 35b, 35c, 36a, 36b and 36c are open and valves 34a, 34b, 34c, 40a, 40b and 40c are closed. When it is desired to defrost a particular evaporator coil such as coil 21b, the condition of the associated valves is reversed; i.e., valves 35b and 36b are closed and valves 34b and 40b are opened, whereby hot gaseous refrigerant is supplied to and through the evaporator coil to defrost the same. The various valves 34, 35, 36 and 40 are preferably and here described as solenoid valves whereby their operation may be automatically controlled by a central electrical timing system (not shown) that is somewhat conventional for these installations whereby the desired and necessary defrosting of each individual evaporator coil may be programmed on such system both as to duration and repetition. As a practical matter in supermarket installations and the like, the refrigerated fixtures 25 are positioned in the public area while the compressor 10 and preferably certain other of the components are remotely located in a "compressor room." Since valves 34, 35, 36 and 40 are automatically controlled by a timing system, it is preferred that these valves be centrally located at the compressor room but expansion valve 26 and modulating valves 30 must be at the evaporator coil, the conduits 20 and 22 will be of substantial length for extending between the compressor room and the fixture contrary to their representation in FIGURE 1. It is also to be noted that with this arrangement there is no need for lengthy control wiring between the fixtures 25 and the compressor room as is required in heretofore conventional systems wherein thermostatic means in the fixture were used to control an inlet metering valve positioned at the same relative location as valves 36 for appropriately supplying liquid refrigerant as fixture temperature dictated.

The modulating valve 30 of this invention is installed at the refrigerated fixture 25 on the outlet of the evaporator coil 21 and a capillary tube 50 extends from the valve 30 into the fixture with the sensing bulb 51 of the capillary tube positioned at an appropriate location in the refrigerated fixture. It is preferred that the bulb 51 be positioned at the most critical temperature location of that particular type of fixture such as in the stream of refrigerated air circulated over the refrigerated product in the type of cases using such coil air circulation. Referring in detail to the embodiment of valve 30 illustrated in FIGURE 2, the valve includes a body portion 60 and a control portion, generally designated 61. The body portion is provided with an inlet 62 which has an appropriate configuration or fitting (not shown) of any conventional type for connecting in full communication with the outlet of evaporator coil 21. Similarly, body portion 60 is provided with an outlet 63 for connecting to the suction line conduit 22. Inlet 62 communicates with a central chamber 64 in body 60 and outlet 63 communicates with an annular chamber 65 surrounding the chamber 64. The upper ends of chambers 64 and 65 are closed by a valve element in the form of a flexible diaphragm 66 normally seated against the annular flange surface 67 between the two chambers and on the rim 68 surrounding the outer chamber 65. During operation of the valve 30 in a manner hereinafter described more fully, the valve element diaphragm 66 flexes upwardly to permit the flow of refrigerant from inlet 62, through chamber 64, around flange surface 67, into chamber 65, and out through outlet 63.

Further, in this embodiment of the modulating valve 30 there is shown a check valve arrangement which may be advantageously included in each of the other embodiments if so desired. This check valve is comprised of a ball 69 adapted to closely fit within chamber 64 and seal-off against a seat 70 during normal operation of the valve. When hot gas defrosting of the associated evaporator coil 21 is performed, the reverse flow of gaseous refrigerant through valve 30 from outlet 63 to inlet 62 is readily accomplished through passageway 71 by the gaseous refrigerant pressure urging the ball 69 upwardly within chamber 64 to open passageway 71. Ball 69 is retained within chamber 64 by any convenient means such as the means shown wherein inlet 62 is of a smaller diameter than the diameters of chamber 64 and ball 69.

Figure 2:
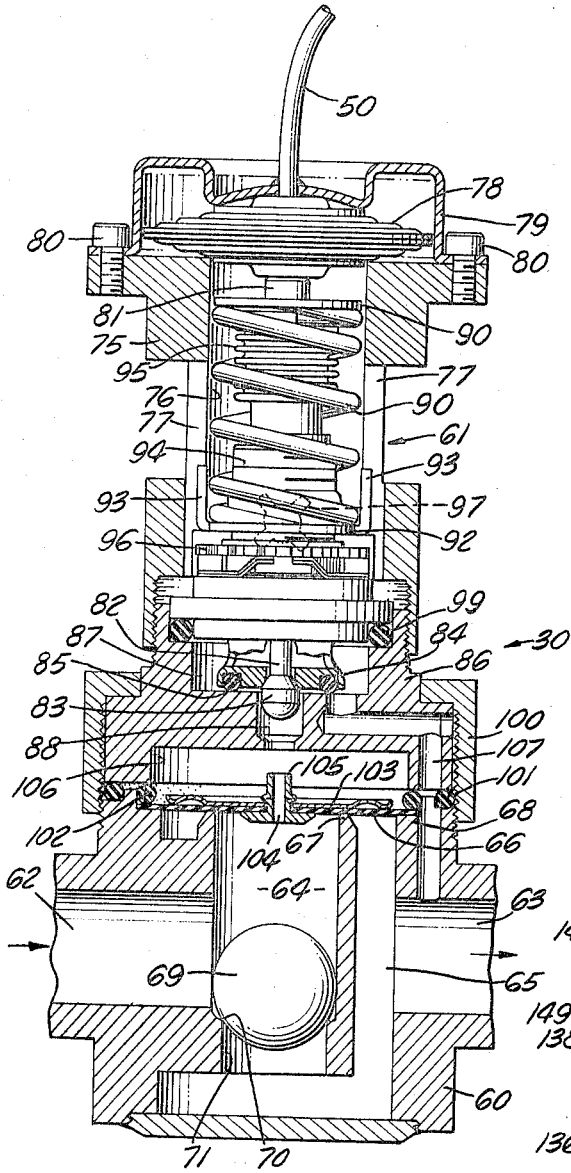
FIGURE 2 is a sectional elevation view of one form of the valve of this invention with the components positioned in the closed condition of the valve.

The control portion 61 of modulating valve 30 may assume many forms for accomplishing the desired functions as will readily appear to those skilled in the art and such forms themselves may be novel or conventional. In FIGURE 2 a single conventional form of means are shown in detail and appropriately modified for performing as the control portion 61 and, in fact, the illustrated means are components of a conventional expansion valve such as might be employed as the expansion valve 26 on the inlet to each evaporator coil 21. Thus, the details of the construction of the control portion 61 form no part of this invention other than in cooperation with the remainder of the valve and therefore will be described only in sufficient detail for an understanding of their functioning in the valve. A cage body 75 is provided with a central bore 76 and a pair of diametrically positioned longitudinal slots 77. A sealed bellows 78 is connected in fluid communication with heretofore described capillary tube 50 and is mounted on the upper end of cage body 75 by a housing 79 secured by screws 80. The lower end of bellows 78 abuts a plunger 81 which in turn extends through the entire control portion 61 and terminates at its lower end as a valve stem 82 having a valve element 83. The valve stem 82 extends through a valve seat 84 and in the uppermost position of plunger 81 the valve element 83 forms a fluid-tight seal with valve seat 84. An annular O-ring seal 85 is provided in the lower surface of valve seat 84 for sealing with a bonnet member 86 of the valve in the assembled condition. The upper portion of valve seat 84 is ported for fluid communication with the surrounding chamber 87. As thus far described it may be seen that expansion of the sealed bellows 78 will urge plunger 81 downwardly, thereby unseating valve element 83, as is shown by way of comparison in FIGURE 3, thereby communicating passageway 88 with chamber 87.

The control portion 61 is also provided with adjustable means for adjusting the responsive movement of plunger 81 to the forces causing expansion and contraction of sealed bellows 78. A coil compression spring 90 extends between a washer 91 attached to the upper end of plunger 81 and a threaded washer 92. Threaded washer 92 has lateral prongs 93 engaging the cage slots 77 for preventing relative rotation and threadedly engages a mandrel 94. The upper end of mandrel 94 is connected in sealing relation with the plunger 81 by means of a flexible sealing bellows 95. An annular sprocket 96 is mounted on the mandrel 94 and is engaged by a sprocket 97 which is in turn connected by a lateral shaft to an external knob 98 (see FIGURE 3) whereby rotation of knob 98 rotates sprocket 97 to turn the sprocket 96 and mandrel 94. Rotation of mandrel 94 relative to cage 75 causes the nonrotatable threaded washer 92 to be threadedly moved upwardly or downwardly on the mandrel. This change in position of threaded washer 92 causes a change in the compressive force exerted by spring 90 on plunger 81, thereby adjustably changing the effect exerted by bellows 78 on plunger 81. Cage body 75 is threadedly attached to bonnet member 86 and sealed therewith by an annular seal 99. Here it is to be noted that an increase in pressure and volume in sealed bellows 78 causes a corresponding downward movement of plunger 81 and valve element 83 to cause a corresponding increase in fluid communication between passageway 88 and chamber 87. The increase in pressure and volume in bellows 78 is caused by an increase in the temperature of the sensing bulb 51 on the end of capillary tube 50 as evidencing an increase in the fixture temperature. Conversely, a decrease in fixture temperature as sensed by bulb 51 results in a decrease in the pressure and volume in bellows 78. Thus, an increase in the temperature within the refrigerated fixture 25 causes corresponding downward-opening movement of valve element 83 and a lowering of the temperature in fixture 25 causes a corresponding upward-closing movement of valve element 83. For a selected setting by knob 98 of the adjustable mechanism of the control portion 61, the amount of movement of valve element 83 will depend on the amount of temperature change in the refrigerated fixture 25. The valve element 83 modulates somewhere between full open and completely closed positions as the fixture temperature changes.

The bonnet member 86 is connected to the body portion 68 by a threaded ring 100 and sealed therewith by an annular O-ring type seal 101. A second annular O-ring type seal 102 positioned inwardly of seal 101 serves to resiliently and sealably mount the diaphragm valve element 66 between the bonnet member 86 and the body portion 60. The flexible diaphragm 66 is provided with a back-up plate 103 on the upper side for preventing excessive distortion of the diaphragm and with a central port 104 therethrough formed in any conventional manner such as by a ferrule 105. Port 104 serves to communicate central chamber 64 with a chamber 106 formed above the diaphragm 66 and within body member 86. Chamber 106 is in direct communication with passageway 88 and valve element 83. A passageway 107 is formed in bonnet member 86 and body portion 60 and extends between and connects chamber 87 and outlet 63, passing between the annular seals 101 and 102. Since outlet 63 is connected to the suction side of the refrigeration system compressor 10 during normal refrigerating operation, a suction is continually applied to chamber 65 and also to chamber 87 through passageway 107.

In the closed position of valve element 83 preventing fluid communication between passageway 88 and chamber 87, the chamber 106 above the diaphragm 66 will be exposed to the same refrigerant pressure present in inlet 62 and chamber 64 through the port 104. Under these conditions the diaphragm 66 will be urged downwardly to the closed position illustrated in FIGURE 2 since first, the upwardly facing area of diaphragm 66 exposed to chamber 106 is substantially greater than the downwardly facing area which is exposed to chamber 64 and second, the pressure in chamber 65 will always be less than the pressure in chamber 64. As previously described, the closed position of valve element 83 represents a contracted condition of bellows 78 which is in turn a result of a temperature "satisfied" condition of the temperature-sensitive capillary bulb 51 positioned in the refrigerated fixture. Since no suction will be applied to the evaporator coil 21 by the compressor 10 in this closed condition of diaphragm 66, the refrigerant within the evaporator coil will slowly increase in temperature and pressure, thereby reducing the refrigerating effect to in turn tend to allow the temperature within the refrigerated fixture 25 to increase. The first minute increase in this fixture temperature is sensed by bulb 51 and transmitted through capillary tube 50 in the form of an increase in volume to bellows 78 to tend to urge plunger 81 downwardly for opening valve element 83 away from valve seat 84. Opening of valve element 83 creates a corresponding communication from chamber 106 through passageway 88 to chamber 87 and thence through passageway 107 to outlet 63, thereby placing an affirmative suction on chamber 106 to tend to evacuate the refrigerant therefrom. The gaseous refrigerant thus evacuated from chamber 106 is continually replaced through port 104 by refrigerant flowing from the higher pressure area of chamber 64 but when valve element 83 is open a sufficient amount to induce an imbalance in the refrigerant flow to and from chamber 106 the pressure in chamber 106 will be reduced. This resultant imbalance of pressure between chambers 64 and 106 will result in an upward flexing of diaphragm 66 when the force on the lower side exceeds the force on the upper side of the diaphragm. The respective forces are a result of the refrigerant pressure times the exposed area of the diaphragm. Upward flexing of diaphragm 66 permits refrigerant to flow from chamber 64 around flange surface 67 into chamber 65 and thence out through outlet 63. It is to be noted that the rate of this flow from chamber 64 to chamber 65 for a given suction pressure on outlet 63 will depend on the size of the gap formed between flange surface 67 and the diaphragm and such gap in turn depends upon the magnitude of upward flexing of diaphragm 66. Moreover, the amount of upward flexing of diaphragm 66 depends on the pressure in chamber 106 which in turn depends on the "rate of evacuation" of chamber 106 as determined by the magnitude of opening of valve element 83. With valve element diaphragm 66 flexed to some degree of open position whereby suction is placed on the evaporator coil 21 by the compressor 10, the refrigerant pressure in the evaporator coil will be proportionately reduced, thereby reducing the temperature of vaporization of the liquid refrigerant and in turn tending to increase the rate of evaporation due to the new lower temperature. Thus qualitatively it may be seen that the higher the discrepancy between desired temperature and actual temperature sensed by bulb 51, the greater will be the flexed displacement of valve element diaphragm 66 to thereby increase both the suction on the evaporator coil and the refrigerating effect. The refrigerating effect is increased by both the rate of evaporation and reducing the temperature of evaporation to tend to reduce this temperature discrepancy sensed by bulb 51. As the discrepancy is reduced and approaches zero, the refrigerating effect is similarly reduced by the modulating movement of valve element 83 toward the closed position and resultant deflection of valve element diaphragm 66 toward the closed position, but not necessary to the completely closed position, whereby the suction on the evaporator coil is reduced. As a practical matter there is always some heat entering a refrigerated fixture and therefore the diaphragm 66 will remain open at least a small amount to accomplish the necessary removal of such heat. Since a continuous suction is applied to outlet 63, the refrigerating effect is determined entirely by the modulating of valve 30 and such modulating is solely responsive to the temperature of the fixture as sensed by bulb 51. Only a very small pressure drop across the valve 30 is necessary to cause its modulating operation and yet the valve will produce and maintain whatever pressure drop is necessary for proper refrigeration. Thus, it is possible to operate the compressor 10 continually without producing an "over-refrigerating" condition to excessively lower the temperature of the evaporator coil. The compressor 10 may be of any conventional type whether with or without capacity control features such as cylinder unloading mechanism conventionally included in larger multicylinder compressors to avoid an over reduction of suction pressure under low load conditions. Elimination of the necessity of these capacity control devices reduces the initial cost of the compressor. Moreover, the rate of power consumption of compressor 10 will be substantially proportional to the rate of refrigeration produced by the aggregate of the evaporator coils since, as is well known, the rate at which power is consumed by a compressor depends nearly directly upon the volumetric rate of refrigerant compressed. This results in a more economical daily operation and the elimination of compressor on-off cycling extends the useful life of the compressor.

From the foregoing description of the operation of valve 30 it is readily apparent that the precision with which the valve can maintain the proper temperature in the refrigerated fixture without undesirable fluctuations depends to a large degree on the precision with which the main valve element (diaphragm 66) can be modulated between the closed and full open positions to maintain the precisely required flow rate. The preciseness of the modulating of the main valve element in turn depends on the precision of the modulating of control element 61. There are numerous conventional control means capable of handling the small volume of refrigerant necessary for control to adequately accomplish this function by various mechanisms and arrangements believed too numerous and well known to those skilled in the art to require detailed descriptions here. However, FIGURES 3, 4 and 5 disclose further modified embodiments of the remaining portion of the modulating valve of this invention which are directed, for the most part, to modifications in the main valve element from that which is shown as a flexible diaphragm 66 in FIGURE 2. Each of these modified embodiments will be assumed to include the heretofore described mechanism of control portion 61 or an equivalent pilot type and temperature-controlled mechanism for causing modulating of the main valve element.

Figure 3:
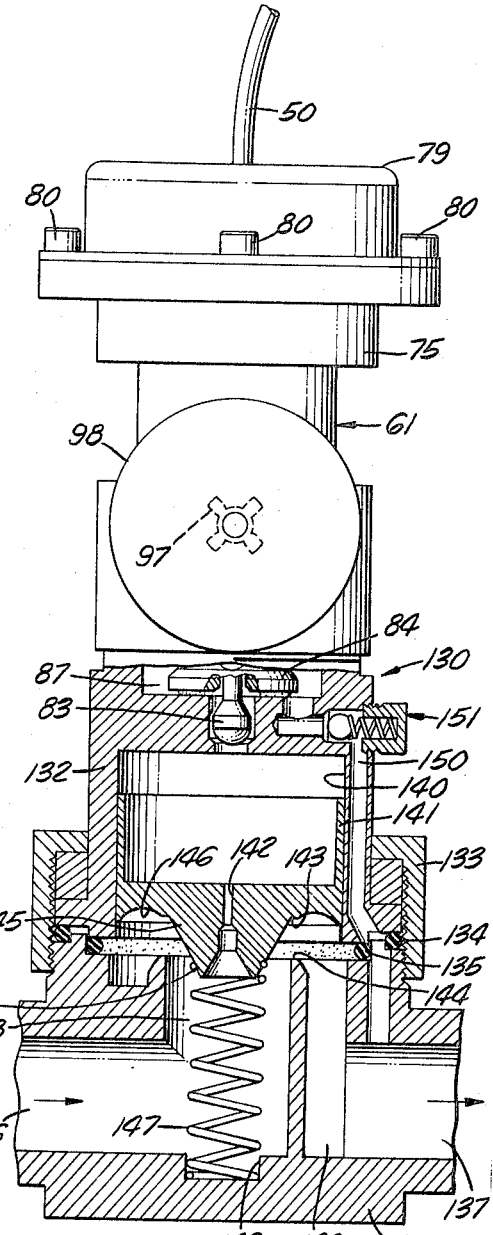
FIGURE 3 is a sectional elevation of a modified form of the valve of this invention with the respective components thereof in a partially opened condition of the valve.

Referring now in further detail to FIGURE 3, the modulating valve, generally designated 130, includes a body portion 131 and a bonnet member 132 joined by a threaded ring 133 with a pair of concentric O-ring type seals 134 and 135 for accomplishing a seal therebetween. The body portion 131 has an inlet 136 for connecting to the outlet of the evaporator coil 21 and an outlet 137 for connecting to the suction line to the compressor.

Inlet 136 communicates with a central chamber 138 and outlet 137 communicates with an annular surrounding chamber 139. Bonnet member 132 is provided with a cylindrical chamber 140 which serves as a cylinder for slidably supporting a piston 141. Piston 141 is provided with a central port 142 for causing restricted communication between body chamber 138 and bonnet chamber 140. The lower side of piston 141 is preferably provided with a seat surface 143 adapted to engage and mate with an upwardly facing annular flange surface 144 positioned between the chambers 138 and 139. Inwardly of surface 143 the lower side of piston 141 is provided with a depending cone portion 145 for cooperating with surface 144 to produce an opening between chambers 138 and 139 which varies in size depending on the position of piston 141 in chamber 140. The underside of piston 141 is also preferably provided with a dished portion 146 outwardly of seat surface 143 to serve to direct the flowing refrigerant from chamber 138 to chamber 139 in a less turbulent manner whereby a quieter operation is achieved. The operation of valve 130 is substantially similar to the heretofore described operation of modulating valve 30 of FIGURE 2 in that with valve element 83 closed, the pressures within chambers 138 and 140 are equalized to seat the piston 141 on surface 144 due to the difference in exposed area above and below the piston. Opening of valve element 83 reduces the pressure within chamber 140, whereby piston 141 is urged upwardly by the pressure within chamber 138 to permit refrigerant flow between the piston and flange surface 144 into the chamber 139 and out through outlet 137. A coil spring 147 is fixed within the body portion 131 at the countersunk portion 148 and is attached to the piston at 149. Coil spring 147 serves to dampen the motion of piston 141 without adversely interfering with either the closing of the piston under closed condition of valve element 83 or the appropriate modulating opening movement of the piston. As with heretofore described modulating valve 30, a passageway 150 is provided for communicating chamber 87 with the outlet of the valve, here outlet 137, to create the pressure reduction in chamber 140 upon opening of valve element 83. Further, in this embodiment a check valve assembly, generally designated 151, is provided in passageway 150 for permitting the flow from chamber 87 to outlet 137 but preventing reverse flow. Such reverse flow is tended to be created upon hot gas defrosting of the associated evaporator coil 21 in the system described with respect to FIGURE 1 wherein the flow through the valve is in the direction from outlet 137 to inlet 136. Since valve 130 does not include a check valve arrangement including ball 69 described and shown in FIGURE 2, the reverse flow through passageway 150 into chamber 140 would tend to close piston 141 if check valve 151 were not provided. Thus, reverse flow through valve 130 may be readily accomplished even without providing the large check valve arrangement disclosed in FIGURE 2.

Now referring in detail to the modified embodiment of FIGURE 4, the modulating valve 230 is again comprised of a body portion 231 and a bonnet member 232 joined by a threaded ring 233 with similar seals therebetween. Body portion 231 has an inlet 234 communicating with a central chamber 235 and an outlet 236 communicating with an annular chamber 237. The main valve element of this embodiment is again a flexible diaphragm 238 similar to diaphragm 66. A check valve assembly, generally designated 239, is provided in the passageway 240 extending between chamber 87 and outlet 236 to prevent reverse flow therethrough under hot gas defrosting conditions. Again a port 241 is provided in diaphragm 238 for communicating chamber 235 with the larger bonnet chamber 242. However, port 241 is provided through means of an elongated tube 243 extending downwardly into chamber 235 for producing an aspirating effect upon reverse flow through valve 230 under hot gas defrosting conditions. That is to say, when gaseous refrigerant flows from chamber 237 past the annular sealing surface 244 into chamber 235 and out inlet 234, the refrigerant will draw a suction through port 241 to tend to evacuate chamber 242, thereby further tending to cause the diaphragm 238 to flex upwardly to permit full flow of gaseous refrigerant during this reverse flow.

The embodiment of modulating valve 230 in FIGURE 4 also illustrates a further modification in the form of an orifice 245 communicating central chamber 235 with annular chamber 237 and this modification may be advantageously used in the other embodiments where desired. Orifice 245 permits a continuous bleed of refrigerant from the evaporator coil 21 during normal operation without regard for the position of the main valve element, here diaphragm 238. Provision of this orifice has been found advantageous in that a small magnitude of suction on the evaporator coil is always necessary under normal operation and yet the most difficult-to-maintain modulating position of the main valve element diaphragm 238 is in the nearly closed position. The size of the orifice is advantageously varied to suit the particular installation of the valve depending on the magnitude of the pressure drop continuously maintained across the modulating valve. Comparatively speaking, the size of the orifice depends inversely on the magnitude of the pressure drop which will in turn depend on the type of refrigerated fixture or, more accurately, the produce contained therein. For example, in a system in accordance with FIGURE 1 if one of the refrigerated fixtures were a frozen food case while another of the refrigerated fixtures were a fresh produce display case, the pressure drop across the modulating valve 30 associated with the produce case would be substantially greater, thereby advantageously requiring a larger orifice 245. Thus for convenience and versatility it is preferred the orifice 245 be provided in a removable-replaceable element such as a threaded plug 246 adapted to be mounted in the wall between chambers 235 and 237.

Referring now to the embodiment of FIGURE 5, the modulating valve 330 again includes a body portion having an inlet 331, an outlet 332, an annular chamber 333 communicating with outlet 332, and a chamber 334 (in an annular shape) communicating with the inlet 331. A tubular post 335 is positioned within chamber 334 and is provided with an orifice 336 for continuous restricted communication between inlet 331 and chamber 337 in the bonnet member. A piston 338 is slidably mounted on tubular 335 and within cylindrical chamber 337 for modulating movement similar to that of heretofore described piston 141. Further, this embodiment contemplates constructing piston 338 of a self-lubricating resilient material such as Teflon or the like for smooth modulating movement of the piston.

Figure 6:
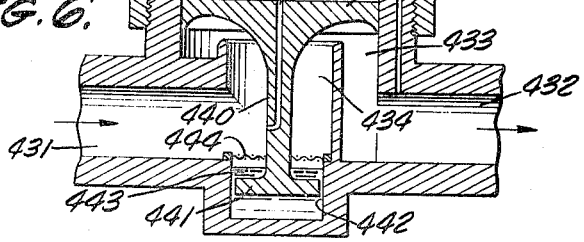
FIGURE 6 is a fragmentary sectional elevation of still another modified form of the valve of this invention with the components thereof in a partially open condition of the valve.

Referring now to the embodiment of FIGURE 6, the modulating valve 430 again includes a body portion having an inlet 431, an outlet 432, an annular chamber 433 communicating with outlet 432, and a central chamber 434 communicating with inlet 431. As in the other embodiments, a passageway 435 extends between chamber 87 and outlet 432 with a check valve assembly 436 operatively positioned therein. A piston 437 is slidably mounted in cylinder 438 and is provided with a bleed port 439, all similar to piston 141. Piston 437 has a stem portion 440 extending downwardly with a piston flange 441 at the lower end. Piston flange 441 fits in a cylindrical chamber 442 in the body portion of the valve with a preselected clearance around the edge. As is well known in the art, oil migrates throughout a refrigeration system and, over a period of time, some oil 443 will collect in chamber 442. The piston flange 441, chamber 442, and oil 443 cooperate to form a "dash pot" arrangement to restrict and dampen sudden movements of piston 437. This serves to prevent the valve 430 and piston from rapid cycling between open and closed positions while "hunting" for the proper modulated position. A screen 444 may be provided for excluding foreign matter from the chamber 442.

Having fully described my invention, it is to be understood that I do not wish to be limited to the details herein set forth or to the details illustrated in the drawings, but my invention is of the full scope of the appended claims.

I claim:

1. A temperature control valve for the evaporator of a refrigeration system fixture, comprising, a body having a pressure chamber, a valve element mounted in said body for movement between open and closed positions, said valve element having means exposed to said pressure chamber, a port in said valve element for restricted communication therethrough to said pressure chamber, means for varying the pressure in said pressure chamber for causing modulating movement of said valve element between said open and closed positions to modulate the backpressure on the evaporator, and solely temperature responsive means for associating with the fixture and having means for operating the said means for varying the pressure in said pressure chamber inversely with fixture temperature.

2. A temperature control valve for the evaporator of a refrigeration system fixture, comprising a body having a chamber for receiving refrigerant, a valve element mounted in said chamber in said body and movable between open and closed positions, a port in said valve element for restricted communication therethrough to said chamber, pilot valve means for controlling the refrigerant pressure in said chamber for causing modulating movement of said valve element between said open and closed positions for modulating the backpressure on the evaporator, temperature responsive means for associating with the fixture and having means for operating the said pilot valve solely responsive to fixture temperature for varying the evaporator backpressure inversely with fixture temperature, and said pilot valve means having adjustable means for selectively setting the fixture temperature which is controlled through the operation of said temperature responsive means.

3. A temperature control valve for the evaporator of a refrigeration system fixture, comprising, a body having an inlet and an outlet, said body having a cylindrical refrigerant receiving chamber, a valve element mounted in said chamber between said inlet and outlet and movable between open and closed positions, said body and said valve element having cooperating means forming a dash pot arrangement for dampening the modulating movement of said valve element, pilot valve means mounted on said body and associated with said chamber for varying the rate of flow of refrigerant to and from said chamber for causing pressure variations in said chamber thereby causing modulating movement of said valve element between said open and closed positions for modulating the backpressure on the evaporator, and temperature sensitive fluid bulb for remotely associating with the fixture and having a tube connected to said pilot valve means for operating the said pilot valve means and causing said valve element modulating movement for varying the evaporator backpressure inversely with fixture temperature.

4. A temperature control valve for the evaporator of a refrigeration system fixture, comprising, a body having an inlet and an outlet for connecting between the evaporator outlet and the refrigeration system compressor inlet respectively, a valve element mounted in said body between said inlet and outlet and movable between open and closed positions, a chamber in said body adjacent said valve element and communicating with said valve element for causing movement of said valve element upon changes in pressure in said chamber, means for communicating said chamber with a source of refrigerant under pressure for supplying refrigerant to said chamber, means for communicating said chamber with said outlet for causing a suction on said chamber for removing refrigerant from said chamber, check valve means mounted in said means communicating said chamber with said outlet for preventing reverse flow in the direction from said outlet to said chamber, pilot valve means for controlling the refrigerant flow through one of said chamber communicating means for varying the refrigerant pressure in said chamber for causing modulating movement of said valve element between said open and closed positions, and temperature responsive means associated with the fixture and having means for operating the said pilot valve means.

5. The valve of claim 4 wherein said chamber is cylindrical and said valve element is a floating piston slidably and sealably mounted in said cylindrical chamber.

6. The valve of claim 4 wherein said valve element is a flexible diaphragm having its periphery rigidly mounted in said body for flexing into said chamber upon changes in pressure in said chamber.

7. The valve of claim 3 wherein said dash pot arrangement includes a cylindrical basin in the lower portion of said body for collecting refrigeration system oil and a flange piston on said floating piston for fitting loosely within said basin.

8. A temperature control valve for the evaporator of a refrigeration system fixture, comprising, a body having an inlet and an outlet for connecting between the evaporator outlet and the refrigeration system compressor inlet respectively, said body having a refrigerant chamber, a valve element mounted in said body and having a surface exposed to said chamber, said valve element positioned between said inlet and outlet and movable between open and closed positions whereby the volume of said chamber is changed, said valve element having another and opposite surface exposed to said inlet, an aperture through said valve element for communicating said inlet to said chamber, pilot valve means for selectively and variably connecting said chamber to said outlet for varying the pressure in said chamber for causing modulating movement of said valve element between said open and closed positions, said valve element movement causing modulating of the backpressure on the evaporator to vary the evaporating temperature of the refrigerant in the evaporator, and temperature responsive means associated with the fixture and having means for operating the said pilot valve means for varying the evaporator backpressure inversely with fixture temperature.

9. A temperature control valve for the evaporator of a refrigeration system fixture, comprising, a body having an inlet and an outlet for connecting between the evaporator outlet and the refrigeration system compressor inlet respectively, said body having a refrigerant chamber, a valve element having two opposed pressure surfaces mounted in said body with one said surface exposed to said chamber, said body having side-by-side chambers communicating with said inlet and outlet and a valve seat separating said side-by-side chambers, the other said valve element surface exposed to said side-by-side chambers and adopted to engage said valve seat, a port in said valve element for restricted communication between said refrigerant chamber and one of said side-by-side chambers, said valve element movable between open and closed positions relative to said valve seat, and means for varying the pressure in said refrigerant chamber relative to the pressures in said side-by-side chambers and inversely of the fixture temperature for causing modulating movement of said valve element between said open and closed positions for modulating the backpressure on the evaporator to vary the evaporating temperature of the refrigerant in the evaporator.

10. The valve of claim 9 wherein said side-by-side chambers are a central chamber communicating with said inlet and a surrounding annular chamber communicating with said outlet with said valve seat in a circular form therebetween.

11. The valve of claim 10 wherein said other surface of said valve element has a tapered nose portion extending into said central chamber, and said valve element has a central port therethrough for drawing refrigerant from said chamber upon reverse flow through the valve during hot gas defrosting of the evaporator.

12. The valve of claim 9 wherein said valve element is a flexible diaphragm mounted in said body for flexing into said chamber for opening the valve and sealably engaging said valve seat to close the valve.

13. The valve of claim 12 wherein said diaphragm has a tube extending into the side-by-side chamber communicating with said inlet for drawing refrigerant from said refrigerant chamber upon reverse flow through the valve.

14. The refrigeration system of claim 16 wherein valved conduit means are provided for selectively supplying hot gaseous refrigerant from said compressor to said suction conduit means, through said modulating valve, and to one or more evaporator means for defrosting such evaporator means.

15. A refrigeration system employing a continuously operating compressor for compressing gaseous refrigerant and a condenser-receiver for condensing the compressed refrigerant to a liquid, comprising, evaporator means connected between the outlet of the condenser-receiver and the inlet of the compressor, an expansion valve means on the inlet of said evaporator means for reducing the pressure of the refrigerant entering said evaporator means, and a modulating valve on the outlet of said evaporator means, said modulating valve having temperature responsive means associated with the fixture refrigerated by said evaporator means for causing a variation in the opening through the valve for modulating the backpressure on said evaporator means inversely relative to the fixture temperature and unrelated to the magnitude of the suction by the compressor, said modulating valve being modulated solely in response to fixture temperature, said modulating valve requiring a minimal pressure difference thereacross for causing said modulating of the evaporator backpressure.

16. A refrigeration system for numerous refrigerated fixtures ideally operating at various temperatures and employing a continuously operating compressor and condenser-receiver for producing a continuous suction and a supply of liquid refrigerant, comprising, an evaporator means for each refrigerated fixture, an expansion valve means on the inlet of each said evaporator means for reducing the refrigerant to all said evaporator means from the condenser-receiver through said expansion valve means, suction conduit means connecting the compressor inlet to the outlets of the evaporator means, a modulating valve on the outlet of each said evaporator means, each said modulating valve having means for varying the opening therethrough for restricting the communication between said evaporator means and said suction conduit means, and each said modulating valve having temperature sensitive means positioned in the associated refrigerated fixture for controlling the said means for varying the valve opening to modulate the backpressure on that said evaporator means inversely of the temperature of that fixture, said modulating valve being modulated solely in response to fixture temperature, said modulating valve requiring a minimal pressure difference thereacross for causing said modulating of the evaporator backpressure.

17. A refrigeration system for numerous refrigerated fixtures ideally operating at various temperatures, comprising, a continuously operating compressor means of an adequate unvariable capacity for accommodating the full load of all the fixtures and for providing a continuous suction, a condenser-receiver means for condensing the compressed refrigerant and providing a continuous supply of liquid refrigerant, an evaporator means for each refrigerated fixture, an expansion valve means on the inlet of each said evaporator means for reducing the refrigerant pressure, conduit means supplying liquid refrigerant to all said evaporator means from the condenser-receiver through said expansion valve means, suction conduit means connecting the compressor inlet to the outlets of the evaporator means, a modulating valve on the outlet of each said evaporator means, each said modulating valve having means for varying the opening therethrough for restricting the communication between said evaporator means and said suction conduit means, and each said modulating valve having temperature sensitive means positioned in the associated refrigerated fixture for controlling the said means for varying the valve opening to modulate the backpressure on that said evaporator means inversely of the sensed temperature of that fixture, said modulating valve being modulated solely in response to fixture temperature, said modulating valve requiring a minimal pressure difference thereacross for causing said modulating of the evaporator backpressure.

References Cited by the Examiner

UNITED STATES PATENTS

| | | | |
|---|---|---|---|
| 2,401,144 | 5/1946 | Dube | 62—217 X |
| 2,665,072 | 1/1954 | Ray | 251—33 X |
| 2,841,174 | 7/1958 | Frye | 137—599 X |
| 2,933,257 | 4/1960 | Clark | 251—46 X |
| 2,933,348 | 7/1961 | Boyle | 62—217 |
| 3,242,688 | 3/1966 | Miller | 62—217 |

MEYER PERLIN, *Primary Examiner.*